US009489644B2

(12) United States Patent
Brozovich

(10) Patent No.: US 9,489,644 B2
(45) Date of Patent: Nov. 8, 2016

(54) VEHICLE DRIVE MATCHING SYSTEM AND METHOD

(75) Inventor: Shawn Daniel Brozovich, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 970 days.

(21) Appl. No.: 13/402,963

(22) Filed: Feb. 23, 2012

(65) Prior Publication Data

US 2013/0226365 A1 Aug. 29, 2013

(51) Int. Cl.
G05D 1/00 (2006.01)
G06Q 10/04 (2012.01)
G06Q 50/30 (2012.01)

(52) U.S. Cl.
CPC ............ *G06Q 10/047* (2013.01); *G06Q 50/30* (2013.01)

(58) Field of Classification Search
CPC ..... G01C 21/34; G01C 21/00; G01S 13/825; G06Q 10/02; G06Q 10/047; G06Q 30/02; G06Q 30/08; G06Q 50/01; G06Q 50/30; G06Q 10/04; G06Q 10/06; G06Q 10/10; G06Q 30/0212; G06Q 30/0217; G06Q 30/0226
USPC .................. 701/1, 117, 409, 533; 342/357.25
See application file for complete search history.

(56) References Cited

U.S. PATENT DOCUMENTS

| 7,941,267 | B2 * | 5/2011 | Adamczyk et al. .......... 701/409 |
| 8,285,571 | B2 * | 10/2012 | Demirdjian et al. ............. 705/6 |
| 8,489,326 | B1 * | 7/2013 | Na et al. ........................ 701/426 |
| 8,498,953 | B2 * | 7/2013 | Lehmann et al. ............... 706/21 |
| 8,504,295 | B2 * | 8/2013 | Lerenc ........................... 701/527 |
| 8,612,273 | B2 * | 12/2013 | Johnson ....................... 705/7.11 |
| 8,730,033 | B2 * | 5/2014 | Yarnold et al. .......... 340/539.13 |
| 8,868,529 | B2 * | 10/2014 | Lerenc ........................... 707/704 |
| 8,909,462 | B2 * | 12/2014 | Lection et al. ............... 701/117 |
| 8,918,231 | B2 * | 12/2014 | Rovik ............................... 701/2 |
| 2001/0056363 | A1 * | 12/2001 | Gantz et al. ....................... 705/9 |
| 2004/0049424 | A1 * | 3/2004 | Murray et al. ................... 705/14 |
| 2006/0059023 | A1 * | 3/2006 | Mashinsky ........................ 705/5 |
| 2007/0162550 | A1 | 7/2007 | Rosenberg |
| 2008/0077309 | A1 * | 3/2008 | Cobbold ........................ 701/117 |
| 2008/0195428 | A1 | 8/2008 | O'Sullivan |
| 2008/0275990 | A1 | 11/2008 | Prasad et al. |
| 2009/0170434 | A1 | 7/2009 | Tengler et al. |
| 2010/0207812 | A1 * | 8/2010 | Demirdjian et al. ..... 342/357.09 |
| 2012/0290652 | A1 * | 11/2012 | Boskovic ....................... 709/204 |
| 2013/0096827 | A1 * | 4/2013 | McCall et al. ................ 701/533 |
| 2013/0226365 | A1 * | 8/2013 | Brozovich ......................... 701/1 |

FOREIGN PATENT DOCUMENTS

DE 20309319 U1 12/2003

* cited by examiner

*Primary Examiner* — Redhwan K Mawari

(74) *Attorney, Agent, or Firm* — Jennifer M. Stec; Brooks Kushman P.C.

(57) ABSTRACT

A vehicle includes a route collection module that collects drive history data describing a plurality of routes traveled by the vehicle and associated departure and arrival times for each of the routes, and a vehicle computing system that sends the drive history data and, in response, receives contact information for at least one driver of at least one other vehicle based on a similarity between the collected drive history data and drive history data associated with the at least one other vehicle. The vehicle further includes an interface that displays or plays the contact information to facilitate ride sharing between a driver of the vehicle and the at least one driver of the at least one other vehicle.

3 Claims, 2 Drawing Sheets

VEHICLE DRIVE MATCHING SYSTEM AND METHOD

TECHNICAL FIELD

This disclosure relates to systems and methods for finding carpool partners.

BACKGROUND

Automated recommendation systems have been used in book and music retail. For example, current systems give recommendations regarding which books or music to buy based on past purchases and the purchases of others. Similarly, with Global Positioning Systems (GPS), it may be possible to determine a vehicle's routes and recommend driving partners based on the previous routes traveled by the vehicle.

SUMMARY

A method for drive profile matching includes receiving, by a processing device, a plurality of drive histories associated with a plurality of vehicles. Each of the drive histories identifies one of the vehicles and a plurality of routes traversed by the one of the vehicles. Each of the routes has associated departure and arrival times. The method further includes generating data values representing a similarity between at least two of the routes each traversed by a different one of the vehicles based on a path defined by each of the routes and the associated departure and arrival times, identifying at least two or more of the vehicles based on the generated data values, and providing output about the identified vehicles to facilitate ride sharing among drivers of the identified vehicles.

DETAILED DESCRIPTION

Embodiments of the present disclosure are described herein; however, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Carpooling has become popular due to longer commute times, higher fuel prices and an increased desire to be environmentally friendly. Many users may indicate a preference for carpooling over driving alone. Finding successful carpool partner(s), however, can be challenging because of the difficulty in finding a partner whose daily schedule closely resembles a user's schedule. Many people may not accurately report information required to find a successful carpool partner. In the past, people have attempted to advertise a desire to carpool via the Internet. These listings often have people manually input their commute times and locations. Since, manual inputs are prone to human error, people's actual commute times may be unpredictably different. If people's schedules are too dissimilar, they are less likely to carpool together. In this application, the vehicle's route history and travel times are automatically collected to improve the quality of carpool matches by obtaining enhanced data.

Figure 1:
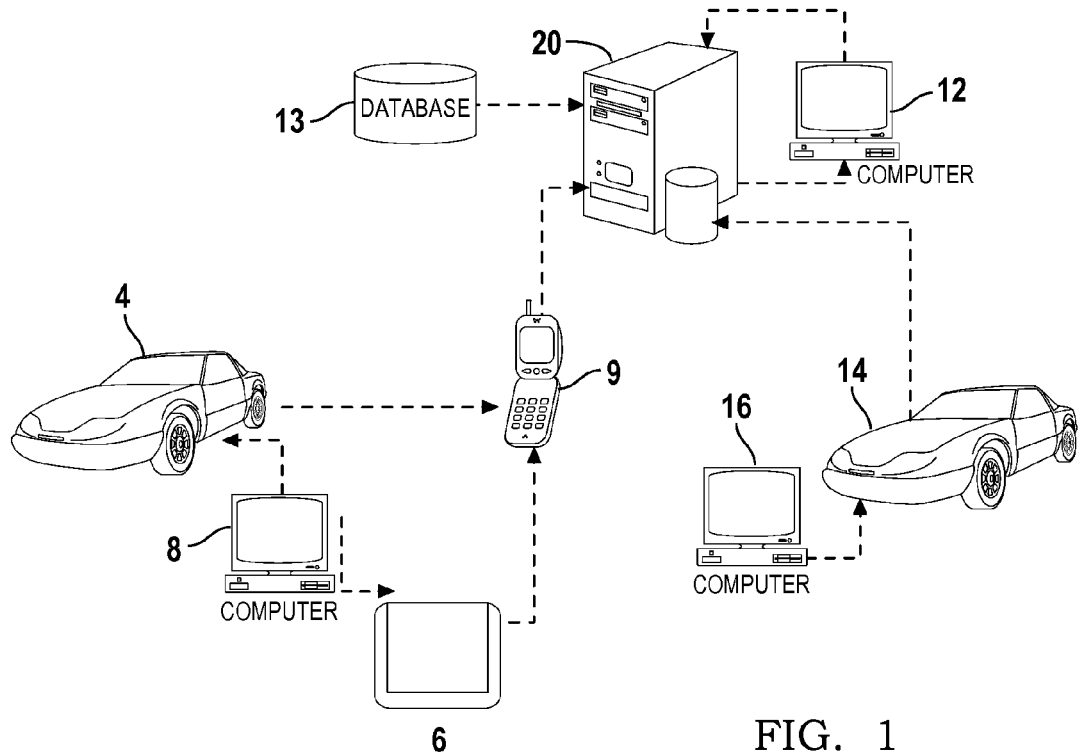
FIG. 1 is a schematic diagram detailing an example computer network and vehicle network environment embodied in the present application.

FIG. 1 illustrates a vehicle-computer network or similar digital processing environment for which the present application can be implemented. Referring to FIG. 1, a vehicle 4 is in communication with a GPS receiver 6. The GPS receiver 6 may be communication with a built-in vehicle computer system (telematics device) 8. The GPS receiver 6 may receive data regarding the current position of the vehicle 4. The GPS receiver 6 may sample the vehicle's current position at set intervals to determine the route that the vehicle 4 may be travelling. The GPS receiver 6 communicates this data to the telematics device 8. The telematics device 8 is in communication with a mobile network connection 9. The telematics device 8 may also collect data regarding other parameters used for finding a carpool match. These parameters may include radio station preferences, specific routes taken, start times, end times, and day to day variations in the departure and arrival times associated with a particular route. The telematics device 8 may contain an internal clock or alternatively, the telematics device 8 may receive the current time through the mobile network connection 9. Using data regarding the current time, the telematics device 8 may record arrival times and departure times for each of the routes traveled by the vehicle 4. An amalgamated set of data regarding vehicle commutes can be received by a network cloud server 20. The server 20, using the data received from other vehicles and the vehicle 4, may ascertain a carpool match as explained below.

A network cloud 12 can represent one or more interconnected network systems through which the systems and hosts described can communicate. The network cloud 12 can include packet-based networks that operate through a wide area network such as a 3G network on a mobile phone. Vehicle nodes 14 are communicatively connected to the network cloud through a multitude of communications devices. These communication devices can include an internal communication device capable of connecting with a wide-area network located on the vehicle 4. Alternatively, the vehicle 4 can interface with the mobile phone network of the user. Additionally, there can be optional computer nodes 16 that are communicatively connected to the network. These computer nodes 16 can be personal computers of the users, mobile phones or other computing devices. These computer nodes 16 can be used to communicate other preferences or data from the user that is not gathered automatically through the vehicle 4. Some examples of user-defined preferences can include the user's driving style, his flexibility with regards to start and end times, and the user's flexibility in regards to deviating slightly from the daily route.

The network cloud 12 can contain physical servers 20 which can be used to implement the functionality described. In one example, the physical server 20 can contain a multitude of hardware processors and cache systems for data-processing. The physical server 20 is also in communication with a database which stores both the vehicle-gathered data and the user-defined data stored in various data structures.

Current methods of finding carpooling matches often require the user to input commute times and locations manually. People may not accurately input their commute times. Many people claim they work from Monday-Friday from 9 to 5 pm. Some people can be habitually late. Their actual commute times can vary significantly from their inputted times. For example, two users Alan and Bob, both could manually input their work hours as Monday-Friday starting at 9 am and returning at 5 pm. Alan, however, could be habitually late and therefore he could actually go to work at 9:30 am and return home at 6:15 pm. Bob, on the other hand, could leave earlier than he inputs. Therefore, Bob's actual commute would be going to work at 8:30 am and returning at 4:45 pm. If Alan and Bob attempted to carpool with each other believing that they have the same working hours, they could be frustrated because there is over one hour difference in their actual work hours. This can diminish the likelihood that they would repeatedly commute because both parties are required to make significant adjustments to their commuting practices.

Instead of relying on users to provide estimations regarding their commute times and routes, the vehicle 4 collects the data automatically using the telematics equipment 8. The vehicle 4 also matches the most suitable carpool matches using a variety of factors that would lead to a more successful carpooling match.

Figure 2:
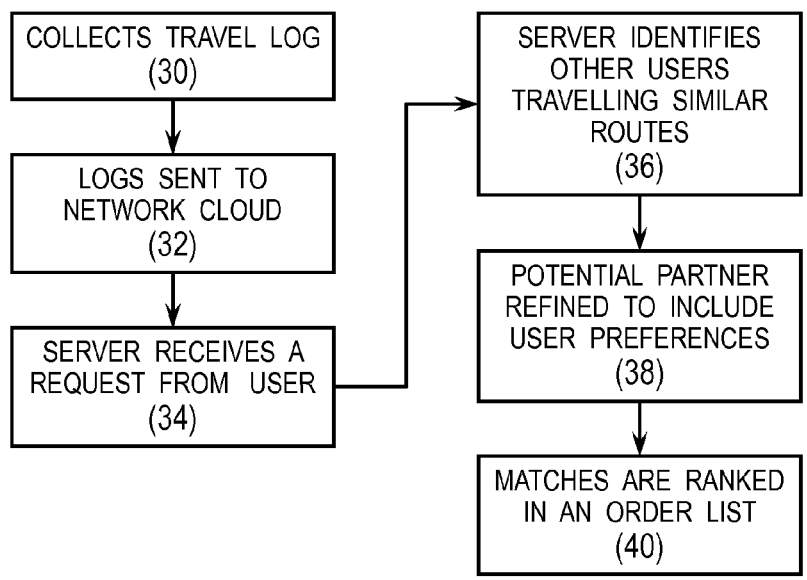
FIG. 2 is a flow chart detailing the matching sub-algorithm for finding carpool partners.

FIG. 2 is a flow chart detailing a car-pool matching algorithm. At operation 30, the vehicle 4 can collect data relevant for finding optimal carpool matches. The data collected can include recently traveled routes, frequency of the routes traveled, and arrival times and departure times. This can be accomplished using the built-in vehicle GPS receiver that is located on a variety of vehicles. The built-in GPS receiver can track the present position of the vehicle at any given time. By sampling the location of the vehicle during certain pre-defined intervals, the GPS receiver can discern the vehicle route. The arrival times and departure times can be gathered through an internal vehicle clock that can be embedded in many vehicle control systems. The frequency of travelling a particular route can be gleaned through a counter for each of the routes. Some routes, such as children's activities, could be traveled only 2-3 times a week. It would be possible to commute with others doing the same activities. There might also be other possible user-defined parameters that could be relevant to a subset of users that the vehicle could also collect in addition to the above-defined parameters At operation 32, the vehicle 4 sends a log of previously traveled routes to a network cloud 12. The server 10 communicates with a database, which can store the log of previously traveled routes to a network cloud 12. When uploading the data, the database can be indexed by route. This would enable the database to remember and associate previously matched routes.

At operation 34 in one of the embodiments, the server 10 receives a notification from a user requesting a carpool partner. The notification can be either for a specific route or a general request. If there is a request for a specific route, the user will be asked to identify for which of the most frequently traveled routes she wishes to find a carpool partner. The user can manually input a specific route or select a pre-identified route that the user travels. The user can also send optional preferences during this time. Alternatively, the user can preload these optional preferences using either his home computer or his mobile phone. The optional preferences can include possible flexibility regarding commute times, willingness to deviate from the route to accommodate carpooling partners, user network restrictions, and music and radio station preferences. User network restrictions can be a limiting factor to ensure that the carpool match is a trusted user. The network restrictions, for example, could be limited to people working at a certain company. Alternatively, it can be people located within a certain radius from the user, or people located within a specific sub-division. Users can optionally choose to enroll in specific networks.

At operation 36, the network cloud 12 identifies other users who are traveling similar route patterns. This will be discussed more in detail with reference to FIG. 3. This is accomplished by looking at the similarity between user's routes. There are many route-matching algorithms available in the art. One possible method includes comparing the starting points and ending points for each of the routes. After this step is performed, there is an associated list of users who drive substantially similar routes. When users who travel a substantially similar route are identified, the algorithm further refines the candidates based on other factors. This allows the server to limit its search space from all users to a set of users who are located closer to each other, thereby resulting in quicker solutions.

At operation 38, the list of candidates is further refined. Users can be filtered, for example, based on other criteria selected by the first user. The algorithm can also use a system default if no other criteria have been uploaded by the first user. For example if a user has a flexible time to return from work, but has to go to work every day at 8:00 am, the algorithm can give more weight to the similarity between the start times and less weight to the similarities between the return times. The algorithm creates a weighting function that will give users who are more similar a higher matching score. This will be discussed more in detail in FIG. 4.

At operation 40, the list of remaining candidates is ordered based on their similarity score. The candidates with the highest similarity score to the first user will be deemed as the "best" match. The matches with the higher similarity score, as calculated at operation 38, are listed first while the less suitable matches are listed later on the list. This allows the users an opportunity to contact the "best" matches first followed by the less suitable matches if the best matches are either unresponsive or do not lead to a successful carpool partner for other reasons.

Figure 3:
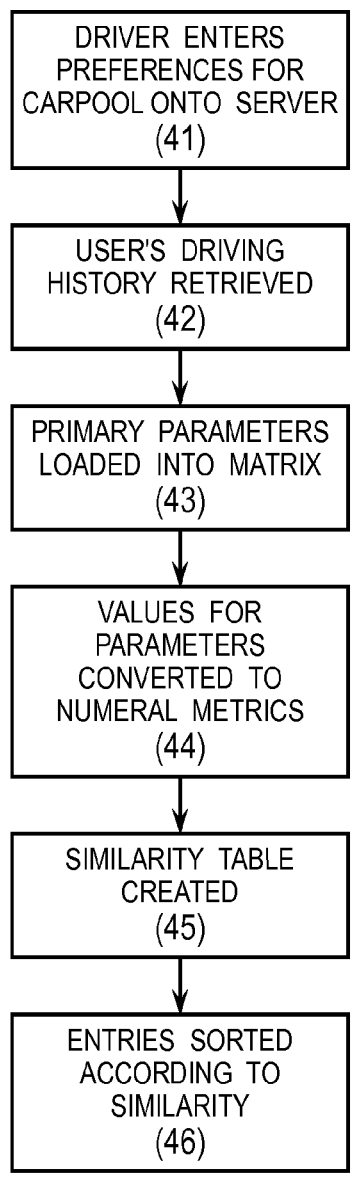
FIG. 3 is a flow chart detailing the scoring sub-algorithm for potential carpool partners.

FIG. 3 is a flow chart detailing how users with similar routes are identified. At operation 41, the driver uploads a set of preferences for ride-sharing.

Although there are currently many recommendation systems for various products such as books and music, most of these recommendation systems perform a discrete analysis between the products used by the users. Therefore, they are able to give a list of "similar" items, but they are not able to rank the items on the basis of similarity. For example, there are recommendation systems that suggest to a user to buy a certain book B after the user buys another related book A.

These recommendation systems work by looking at other purchases by users who purchased the related book A and recommend the book that was most frequently bought by purchasers of book A. In this system, a secondary analysis examines many different factors for similarity between routes that cannot be discretely quantified such as the number of books purchased. For example, the difference in commute time could range from 1 minute to 10 minutes. Therefore, one would need to be able to figure out "how similar" the commute times are. In other recommendation systems, the similarities can be mostly limited to binary matches such as whether or not the users bought the same book or downloaded the same song.

At operation 42, the user's driving history is retrieved from a database and parsed into a matrix that contains the values of the primary parameters that need to be matched. These primary parameters may include routes defined by a starting point, ending point, starting time and ending time.

At operation 43, the primary parameters are loaded into the matrix. There are many methods available in the art for comparing data for similarity. These can include, for example, singular-value decomposition, Bayesian matching, and Hidden Markov Models. In this particular embodiment, the nearest-neighbor matching will be shown. Any of these techniques, however, can be used to find similarity between data parameters.

At operation 44, the entries into the matrix are converted into a numerical value representing the routes for analysis. These factors can include the physical distance between starting and ending points, starting time and ending time for each of the previously traveled routes. For example, the starting point can be a function of the latitude and longitude of a given point. Other data points could have other heuristics to convert them into numerical values.

At operation 45, a similarity table can be created by computing the distance between the numerical values. One way of doing that is using a simple Euclidean least-squares method where the difference between each of the parameters is calculated to determine similarity between the users. Other possible methods can include Bayesian matching or Hidden Markov Model algorithms to find similarity between two users.

At operation 46 using the similarity table, the algorithm identifies a set of users. These users are mapped to the primary user in a way that it can reflect the similarity in routes with the primary user. There are various data structures that could accomplish this. One such example includes having the similarity in routes be represented by a graph with weighted nodes. This will allow the algorithm to keep track of other similar users in case the first carpool match does not work out. Referring to FIG. 3, at operation 36 the algorithm then compares these similarity values against a threshold value to see if the routes are close enough for the user to be matched. The threshold value is different for each user as users have a different tolerance for deviations. For example, one user could have a job where he has flextime. Therefore, the starting and ending times are not as important to him as it is to other users. This algorithm accounts for the variations that are acceptable to each user.

Figure 4:
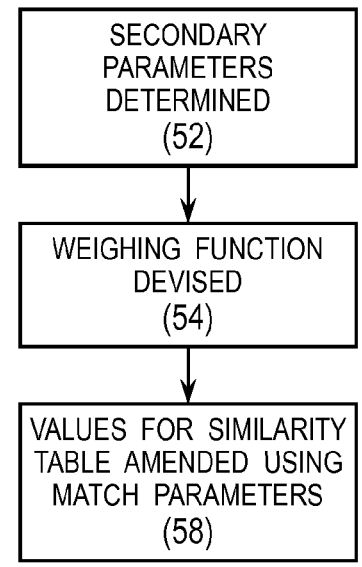
FIG. 4 details the weighing function to determine best match based on optional parameters.

FIG. 4 details the weighing function to determine best match based on optional parameters. At operation 52, the primary step involves identifying secondary parameters or factors that the user would like the algorithm to consider. The user can upload an optional "user-profile" into the database. The database stores vehicle-specific information. The secondary parameters can include networks to limit the search, driving style, flexibility in scheduling, willingness to deviate in order to accommodate carpool, and radio-station preferences among others. The user, using either the telematics device located on his vehicle or a computing device, can rank these factors among others in order of importance. Additionally, the user can also give a numerical weight to the factors he considers important. This list of preferences can be stored in a matrix representing each user.

At operation 54, a weighting function is devised for each of the corresponding parameters. The weighing function is constructed using the user's rankings or numerical weights. The weighing function can be a simple multiplier, or alternatively a more complicated polynomial function. At operation 56, the values for the secondary parameters for users that were at operation 46 are loaded into the matrix.

At operation 58, the values are amended using the weight function. At operation 50, a least-distance analysis is completed and the users who most closely match are then put in an ordered list. At operation 52, a list of acceptable users is sent to the display screen located on the telematics device or alternatively through a text message or email to the user indicating possible carpool matches. In the telematics display screen, a link with the other user's contact information can appear. Once selected, the link could directly call or send a message to the other user.

Figure 5:
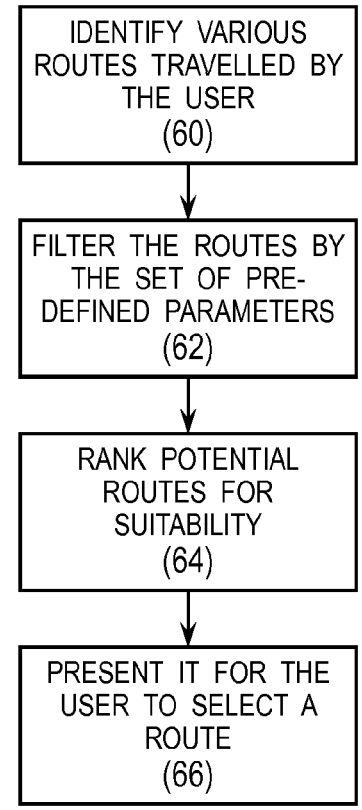
FIG. 5 is a flow chart detailing automatic carpool matches based on the user's drive history.

FIG. 5 is a flow chart indicating automatic carpool matches based on the user's drive history. Although, a user can identify a route that he wishes to find a carpool partner, sometimes users do not think to input the route. Alternatively, they could be oblivious to the possibility of available carpool matches. In this embodiment, the vehicle user has routes that are suitable for carpool matches suggested to him as well as potential partners.

At operation 60, a log of recently traversed routes is examined to identify potential routes that are suitable for carpooling. In FIG. 2, the user manually inputted a route for which he wished to find a carpool match. In operation 60, the server attempts to automatically find suitable routes for carpool matches. For example, if the user traveled a particular route every day, the user could be more inclined to want to find a carpool match. This may be accomplished by examining the log of recently traveled routes by a first user. Using the log, the algorithm can ascertain suitable routes for carpooling.

At operation 62, the routes are filtered by these predetermined parameters that would make it more likely that the user would want to carpool. The algorithm can take into account how frequent the route is traversed, additionally, the algorithm can also take into consideration arrival times and departure times. If for example the arrival time and departure time is closer to rush hour, the user is more likely to want to carpool, as opposed to being later in the evening when there is less traffic. The filter can be created by weighting different parameters and creating a function such that the results with the highest scores would be the ones that are most suitable.

At operation 64, the routes are ranked based on the score received in the filter. The highest ranking route is selected as this maybe the route that would be most suitable for carpool matching. At operation 66, the highest ranking route is presented to the user. It can be presented either on the mobile device of the user or the telematics screen.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the algorithms can be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure and claims. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and could be desirable for particular applications.

What is claimed is:

1. A vehicle comprising:
   a controller configured to
      collect drive data describing travelled routes,
      send, off-board, the drive data,
      responsive to the sending, receive and display information for a driver of another vehicle based on a degree of similarity between the drive data and drive data of the another vehicle that depends on a user specified schedule deviation tolerance, and
      responsive to input selecting the information, initiate a telephone call to the another vehicle.

2. A method comprising:
   by a vehicle,
      collecting drive data describing travelled routes,
      sending, off-board, the drive data,
      responsive to the sending, receiving and displaying information for a driver of another vehicle based on a degree of similarity between the drive data and drive data of the another vehicle that depends on a user specified schedule deviation tolerance, and
      responsive to input selecting the information, initiating a message to the another vehicle.

3. A vehicle comprising:
   a controller configured to
      collect drive data describing travelled routes,
      send, off-board, the drive data,
      responsive to the sending, receive and play information for a driver of another vehicle based on a degree of similarity between the drive data and drive data of the another vehicle that depends on a user specified schedule deviation tolerance, and
      responsive to input selecting the information, initiate a telephone call or message to the another vehicle.

* * * * *